United States Patent
Haag et al.

(10) Patent No.: US 11,454,942 B2
(45) Date of Patent: Sep. 27, 2022

(54) METHOD FOR STARTING UP A FIELD DEVICE IN A SIMPLIFIED MANNER

(71) Applicant: Endress+Hauser SE+Co. KG, Maulburg (DE)

(72) Inventors: Tanja Haag, Schopfheim (DE); Florian Palatini, Kleines Wiesental (DE); Eric Birgel, Schopfheim (DE)

(73) Assignee: ENDRESS+HAUSER SE+CO. KG, Maulburg (DE)

( * ) Notice: Subject to any disclaimer, the term of this patent is extended or adjusted under 35 U.S.C. 154(b) by 254 days.

(21) Appl. No.: 16/954,158

(22) PCT Filed: Nov. 14, 2018

(86) PCT No.: PCT/EP2018/081148
§ 371 (c)(1),
(2) Date: Jun. 15, 2020

(87) PCT Pub. No.: WO2019/115116
PCT Pub. Date: Jun. 20, 2019

(65) Prior Publication Data
US 2021/0165376 A1    Jun. 3, 2021

(30) Foreign Application Priority Data
Dec. 15, 2017   (DE) ..................... 10 2017 130 137.2

(51) Int. Cl.
*G05B 19/042*   (2006.01)
*G06T 7/62*   (2017.01)
*G01F 23/296*   (2022.01)

(52) U.S. Cl.
CPC ......... *G05B 19/042* (2013.01); *G01F 23/296* (2013.01); *G06T 7/62* (2017.01)

(58) Field of Classification Search
CPC ........ G05B 19/042; G01F 23/296; G06T 7/62
(Continued)

(56) References Cited

U.S. PATENT DOCUMENTS

| 6,167,464 A | 12/2000 | Kretschmann | |
|---|---|---|---|
| 2011/0249000 A1* | 10/2011 | Isenmann | G05B 19/4185 345/428 |

(Continued)

FOREIGN PATENT DOCUMENTS

| CN | 101460910 A | 6/2009 |
|---|---|---|
| CN | 104897091 A | 9/2015 |

(Continued)

*Primary Examiner* — Hirdepal Singh
(74) *Attorney, Agent, or Firm* — Mark A. Logan; Endress+Hauser (USA) Holding Inc.

(57) ABSTRACT

Disclosed is a method for starting-up using a service unit a field device of automation technology mounted on a container at a measuring location, wherein the service unit has a display unit and a camera, comprising: identifying the field device using the service unit; showing on the display unit at least one parameter to be set, wherein the at least one parameter to be set is ascertained based on the identifying of the field device, showing on the display unit the field of view of the operator, and showing at least one virtual symbol superimposed on the field of view shown on the display unit; selecting at least one predetermined parameter value, or inputting at least one parameter value; confirming the selected, or input, parameter value, and transferring the confirmed parameter value into the field device.

14 Claims, 1 Drawing Sheet

(58) Field of Classification Search
USPC .......................................................... 700/96
See application file for complete search history.

(56) References Cited

U.S. PATENT DOCUMENTS

| | | | |
|---|---|---|---|
| 2015/0254499 A1 | 9/2015 | Pang et al. | |
| 2016/0004320 A1* | 1/2016 | Lundberg | G06F 3/03 345/633 |
| 2016/0343124 A1* | 11/2016 | Sundheimer | G01F 22/00 |
| 2017/0284854 A1* | 10/2017 | Skowaisa | G01F 23/804 |

FOREIGN PATENT DOCUMENTS

| | | | |
|---|---|---|---|
| DE | 102004016329 A1 | 5/2005 | |
| DE | 102012104858 A1 | 12/2013 | |
| DE | 102013108490 A1 | 2/2015 | |
| DE | 102016207058 A1 | 10/2017 | |
| EP | 1480021 B1 | 11/2014 | |
| WO | 2007025879 A1 | 3/2007 | |
| WO | 2007066166 A1 | 6/2007 | |
| WO | 2010015455 A1 | 2/2010 | |
| WO | WO-2010015455 A1 * | 2/2010 | ......... G05B 19/0426 |
| WO | 2016005121 A2 | 1/2016 | |
| WO | 2016187376 A1 | 11/2016 | |

* cited by examiner

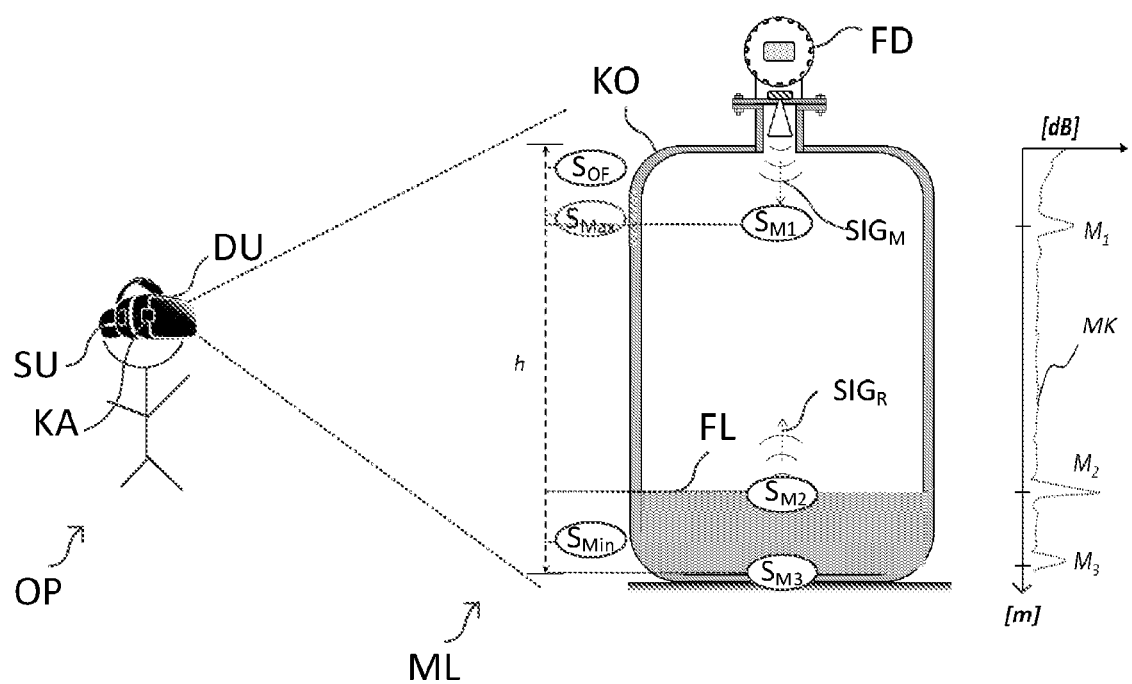

METHOD FOR STARTING UP A FIELD DEVICE IN A SIMPLIFIED MANNER

CROSS-REFERENCE TO RELATED APPLICATIONS

The present application is related to and claims the priority benefit of German Patent Application No. 10 2017 130 137.2, filed on Dec. 15, 2017 and International Patent Application No. PCT/EP2018/081148, filed on Nov. 14, 2018, the entire contents of which are incorporated herein by reference.

TECHNICAL FIELD

The invention relates to a method for starting-up by means of a service unit a field device of automation technology mounted on a component, especially a container, at a measuring location, wherein the service unit has a display unit and a camera.

BACKGROUND

Known from the state of the art are field devices, which are used in industrial plants. Field devices are often applied In automation technology, as well as in manufacturing automation. Referred to as field devices are, in principle, all devices, which are applied near to a process and which deliver, or process, process relevant information. Thus, field devices are used for registering and/or influencing process variables. Serving for registering process variables are measuring devices utilizing sensors. Such are used, for example, for pressure- and temperature measurement, conductivity measurement, flow measurement, pH measurement, fill level measurement, etc. and register the corresponding process variables, pressure, temperature, conductivity, pH value, fill level, flow, etc. Used for influencing process variables are actuators. Such are, for example, pumps or valves, which can influence the flow of a liquid in a tube or the fill level in a container. Besides the above mentioned measuring devices and actuators, referred to as field devices are also remote I/Os, radio adapters, and, in general, devices, which are arranged at the field level.

For fill level measurement of fill substances in containers, contactless measuring methods have proven themselves, since they are robust and require low-maintenance. In such case, "container" within the scope of the invention refers also to open containers, such as, for example, a vat, lake or ocean or flowing body of water. A further advantage of contactless measuring methods is their ability to measure the fill level virtually continuously. In the field of continuous fill level measurement, consequently, primarily ultrasonic, or radar-based, measuring methods are applied (in the context of the invention, the terminology, ultrasound, refers to sound waves in a frequency range between 14 kHz and 1 GHz, while the terminology, "radar" refers to signals, or electromagnetic waves, having frequencies between 0.03 GHz and 300 GHz).

In the case of ultrasonic or radar-based fill level measurement, the pulse travel time, measuring principle is an established measuring principle. In such case, ultrasonic, or microwave pulses are transmitted as measuring signals cyclically in the direction of the fill substance and the travel time to the receipt of the corresponding echo pulse measured. Based on this measuring principle, fill level measuring devices can be implemented with comparatively little circuit complexity. A radar-based, fill level measuring device, which works according to the pulse travel time method, is described, for example, in disclosure document DE 10 2012 104 858 A1. The ultrasonically based companion is described, in among others, the patent, EP 1480021 B1.

When a more complex circuit technology can be tolerated, also FMCW ("Frequency Modulated Continuous Wave") radar can be used as measuring principle for radar-based fill level measurement. An example of a typical construction of FMCW-based fill level measuring devices is shown in disclosure document DE 10 2013 108 490 A1.

The measuring principle of FMCW radar based distance measuring methods rests on transmitting a radar-based measuring signal continuously with modulated frequency. In such case, the frequency of the measuring signal lies in a fixed frequency band in the region of a standardized center frequency. Characteristic for FMCW is, is that the transmitted frequency is not constant, but, rather, changes periodically within a defined frequency band. The change with time is, in such case, according to standard, linear and has a sawtooth- or triangular shape. A sinusoidal change can, in principle, however, also be used. In contrast with the pulse travel time method, the distance, or the fill level, in the case of implementing the FMCW method is determined based on the instantaneous frequency difference between the currently received, reflected, measuring signal and the instantaneously transmitted, measuring signal.

In the case of each of the above mentioned measurement principles (ultrasound, pulse radar, and FMCW) for ascertaining fill level based on the received, reflected, measuring signal, a corresponding measurement curve is recorded. In the case of application of ultrasound, the measurement curve corresponds basically directly to amplitude versus time for the reflected, measuring signal. In the case of the pulse radar-based method, the measurement curve is, due to the high pulse frequency, in contrast, created by undersampling the reflected, measuring signal. In this way, the measurement curve is a time stretched version of the actual, reflected, measuring signal. In the case of implementing the FMCW method, the measurement curve is created by mixing the instantaneously transmitted, measuring signal with the reflected, measuring signal. In all cases, the measurement curve represents, however, the amplitude of the reflected, measuring signal as a function of measured distance.

A large number of such field devices are produced and sold by the Endress+Hauser group of companies.

Field devices, which are placed in a new application of a process installation, or replacement field devices, which replace an aged or defective field device of an application, must in their start-up be specifically adapted to the particular application of the field device at the measuring location. For such purpose, these field devices are configured and parametered during or after their production. The configuration describes, on the one hand, the hardware configuration, for example, the flange material of a flowmeter, as well as, on the other hand, also the software configuration. The parametering means a defining and establishing of parameters, with whose help the operation of the field device is set to the particular features of the application, for example, the measured medium.

Depending on field device type, a field device can have hundreds of different parameters, which are assigned parameter values at start-up. Today, the parametering of a field device is performed by means of software tools. The inputting of parameter values is exclusively text based and assumes a technical understanding on the part of the operator.

In the case of a fill level measuring device, the use of a so-called envelope curve module for its start-up is obligatorily. In such case, a graph is used, which displays an above mentioned measurement curve. Such a measurement curve shows, however, besides the signal actually reflected on the fill substance, also disturbance reflections. The operator must distinguish the actual reflection signal from the signals, which are produced by the disturbance reflections. Also such requires a technical understanding on the part of the operator.

SUMMARY

Based on the above, an object of the invention is to provide a method, which enables also technically inexperienced operators to perform a reliable start-up of field devices.

The object is achieved by a method for starting-up by means of a service unit a field device of automation technology mounted on a component, especially a container, at a measuring location, wherein the service unit has a display unit and a camera, comprising:

identifying the field device by means of the service unit;
showing by means of the display unit at least one parameter to be set, wherein the at least one parameter to be set is ascertained based on the identifying of the field device, wherein the display unit shows the field of view of the operator, and wherein the parameter is shown as at least one virtual symbol, which is superimposed at least partially on the field of view shown on the display unit;
selecting at least one predetermined parameter value, or inputting at least one parameter value;
confirming the selected, or input, parameter value, and
transferring the confirmed parameter value into the field device and storing the parameter value in the field device.

By means of the method of the invention, the operator is supported in simple manner in the start-up a field device. After identification of the field device, the parameters to be set in the field device are automatically downloaded. For this, there is provided in the service unit a database, which contains the parameters to be set for a plurality of field device types. Alternatively, the service unit is connected with an external database, especially a cloud-capable database, by means of an Internet connection, which stores the parameters to be set for a plurality of field device types.

The display unit of the service unit shows the current field of view of the operator. In the simplest case, the display unit is a combined transparent glass with a projector. The operator views through the glass. The surroundings taken in by the glass is referred to as the field of view. The projector is embodied to cast a projection onto the glass, which the operator sees. Superimposed on the field of view of the operator are virtual symbols. These symbols correspond to the parameters to be set. The camera of the service unit registers simultaneously the surroundings and "sees" the same field of view as the operator. In this way, the correct position of the symbols in the field of view can be ascertained. It is provided that the symbols superimpose on the image at that position, which relates to the function/purpose of the parameter currently to be set. If, for example, the type of fill substance or measured medium is to be set, then the corresponding symbol is located on the image of the fill substance, or measured medium. The understanding of the purpose of a parameter is easier for the operator, compared with the previous text based input. The symbols include an input screen, in which the parameter value for the parameter can be input. The manner, in which the input of the parameter values into the input screen of the symbols occurs, depends on the type of service unit. If the position of the camera changes relative to the component of the measuring location, then the image shown on the display unit changes accordingly. The symbols remain, however, on the assigned position of the component and "migrate" accordingly, depending on the shifting of the component in the image.

After transpired input of the parameter values of one or all parameters to be set, the operator enters the inputs. The input parameter values are then transferred from the service unit in such a manner to the field device that the field device is parametered with the input parameter values.

The identification of the field device can occur in different ways. In the simplest case, the operator selects the field device type of the field device from a list, which is displayed on the display unit of the service unit. Then, the parameters to be set are downloaded from the database. Alternatively, identification data are read-out from the field device, especially by means of a radio connection, especially Bluetooth or Wi-Fi, between field device and service unit. Another option is optically identifying the field device. For this, the field device is registered by means of the camera and examined for defined geometries contained in a database. An optical identification of the field device includes also the read-out of an optical code, for example, a barcode or a QR-code, on the field device.

Field devices, which are mentioned in connection with the method of the invention, have already been named above, by way of example, in the introductory part of the description. The method of the invention is suited for all types of field devices and is not, for instance, limited to fill level measuring devices.

In an advantageous embodiment of the method of the invention, it is provided that the display unit shows as field of view of the operator a continuously updated image registered by the camera, and wherein the virtual symbol is superimposed at least partially on the image displayed by the display unit. The display unit of the service unit shows the live image, as recorded by the camera. The operator should direct the service unit in such a manner at the measuring location that the component of the measuring location is registered by the camera. Virtual symbols are superimposed on the current live image of the camera. This method is suited also for service units, which have no transparent glass as display unit, but just a conventional display.

In an advantageous embodiment of the method of the invention, it is provided that a reference geometry is registered by means of the camera, wherein the reference geometry has a defined length in at least one dimension, wherein based on the reference geometry a three-dimensional, polygonal network is created. Known from the literature is the SLAM problem ("Simultaneous Localization and Mapping"), which refers to a problem of robotics, in the case of which a mobile robot must simultaneously create a map of its surroundings and estimate its position within this map. A solution for this problem is the calculating of a three dimensional, polygonal network with the help of a reference geometry.

For this, the camera is either moved around the reference geometry or the angle of sight from the camera onto the reference geometry is slightly varied by means of small movements. Using a stereo camera, this first step can be omitted. Alternatively, a depth camera can be used, which independently executes this step. Then, a three-dimensional image of the geometry is created in the form of a polygonal network. The defined length of at least one of the dimensions of the reference geometry is reported to the service unit, whereby the service unit calculates a defined distance between the meshes of the polygonal network. By expanding, or increasing, the polygonal network, the spatial size and position of the service unit in the three dimensional space can be determined.

In a preferred further development of the method of the invention, it is provided that the three-dimensional, polygonal network is used, in order to measure objects registered by the camera and to define a ruler for the objects registered by the camera and shown in the field of view. Since the service unit knows the mesh size of the three dimensional, polygonal network, any geometries can be registered and measured. This method has a very high accuracy. In connection with the method of the invention, especially the dimensions of the field device and/or the component of the measuring location are measured. On the field of view on the display, now, for example, the sizes of the component can be displayed and/or a ruler length provided, which dynamically changes, when the operator moves the camera toward the component, or away from the component, or the zoom function of the camera is used.

In an advantageous, further development of the method of the invention, it is provided that a container is used as a component of the measuring location, wherein used as field device is a fill level measuring device, which works according to a contactless measuring method, especially according to the ultrasonic, measuring principle, according to the pulse travel time, measuring principle, or according to the FMCW, measuring principle, in order to determine a fill level of a fill substance in the container. These types of field devices have already been described in the introductory part of the description. Instead of fill level measuring devices, any other type of field devices can be used. The following examples refer, however, to fill level measuring devices and parameters typical for fill level measuring devices. In the case of application of other field device types, these parameters are, in given cases, not present and other parameter types are set.

An advantageous embodiment of the method of the invention provides that parameters to be set include a maximum value of a fill level of the fill substance in the container, a minimum value of a fill level of the fill substance in the container and/or an overflow protection value of a fill level of the fill substance in the container. Provided as overflow protection value, in such case, is that fill level of the fill substance, which can be present in the container, without presenting upon further increase of the fill substance a danger of overflow from the container. The minimum value and the maximum value of the fill level are less critical and can be defined as desired by the operator, or according to the requirements of the measuring location.

In an especially preferred embodiment of the method of the invention, it is provided that in the case, in which the container is located in the field of view registered by the camera, the container is measured based on the three dimensional, polygonal network and a scaling of the container in the field of view image is determined, and wherein the symbol of the parameter is arranged in the field of view alongside the container. Especially, it is provided that a longitudinal axis of the container is determined. The symbols are especially arranged in parallel with the longitudinal axis alongside the container. Especially, the container located in the field of view is not superimposed with the virtual symbols. The camera registers the geometry of the container completely and determines the floor of the container. In given cases, the operator is requested to mark the floor of the container in the field of view. The floor of the container is defined as fill level "zero". The service unit defines that the surface of the fill substance rises upon filling of the container along the longitudinal axis of the container.

In an advantageous embodiment of the method of the invention, it is provided that the parameter value for the parameter is numerically input, wherein the symbol of the parameter is arranged in such a manner in the field of view alongside the container that it is located at a fill level alongside the container corresponding, in each case, to the numerical value of the parameter. Since the position of the floor of the container is defined and the geometry of the tank is measured by means of the three dimensional, polygonal network, the position of the fill level surface can be calculated, or simulated, at each input fill level. The particular symbol of the parameter, for example, the maximum height of the fill level of the fill substance, is arranged correspondingly in the field of view, so that it is located at the particularly input fill level. For the operator, it is thereby also evident, whether an input parameter value is at all plausible, or whether the input parameter value corresponds to what the operator thinks it should be.

In an advantageous, alternative embodiment of the method of the invention, it is provided that the symbol is manually arranged in the field of view alongside the container, wherein a fill level is ascertained for the symbol corresponding to the scaling of the container and wherein a converting of the fill level into a numerical value of the parameter occurs. This is opposite to the above described embodiment: Based on the placement of the symbol in the field of view, the service unit calculates the fill level corresponding to the position of the symbol as a numerical value with reference to the floor of the container. The operator is then shown the numerical value. For the operator, it is thereby evident, whether an input parameter value is at all plausible, or whether the input parameter value corresponds to what the operator thinks it should be.

Both methods make it easy to input the limit values for the fill level measurement. The input and verification of the parameter values is essentially intuitive for the operator in contrast to the previously known, text based input.

In an advantageous, further development of the method of the invention, it is provided that a measurement curve of the fill level measuring device is recorded, which measurement curve shows an amplitude of the reflected, measuring signal as a function of a measured distance, wherein the measurement curve has at least two maxima, which are located at first and second fill levels. Such a measurement curve is described in detail in the introductory part of the description. The maxima of the measurement curve correspond, in such case, to reflections of the measuring signal transmitted by the fill level measuring device. Usually, the measuring signal is reflected from the surface of the fill substance and from the floor of the container. However, also other objects located in the container, such as, for example, a stirrer, can lead to a reflection of the measuring signal.

In an advantageous embodiment of the method of the invention, it is provided that the first and the second fill levels are displayed as symbols in the field of view, wherein the symbols are arranged on the corresponding, first and second fill levels to scale at the container shown in the field of view. This shows the operator directly, where in the container the maxima are located, or where in the tank reflections of the measuring signal have occurred.

In a preferred embodiment of the method of the invention, it is provided that as parameter a fill substance maximum of the measurement curve is set, wherein as fill substance maximum that one of the two fill levels is selected, which corresponds to the actual current height of the fill substance. In the case of two maxima, it is, for example, easily evident for the operator, which maximum corresponds to the surface of the fill substance. Thus, one of the two maxima is usually located at the height of the container floor. The second maximum is located above the container floor. For facilitating the correct selection of the maximum, the operator should, however, check, for example, by means of a sight check, that the fill substance is earlier filled into the container in such a manner that the current fill level lies sufficiently removed from objects, for example, stirrers, which can reflect the measuring signal.

In a first variant of the method of the invention, used as service unit are smart glasses. Such smart glasses have a screen, which displays the field of view registered by the camera. For the operator, it appears as if the field of view registered by the camera is registered by the eyes of the operator. Alternatively, the smart glasses includes a projector, which projects an image onto a screen, or a glass, of the eyeglasses. The operator sees the surroundings through the screen of the eyeglasses. At the same time, a camera of the eyeglasses registers the surroundings such that the eyes of the operator register the surroundings. Instead of projecting the entire field of view of the surroundings registered by the camera onto the screen, only the virtual symbols are projected onto the screen. An example of such a smart glasses of the latter type, which are suitable for the method of the invention, is the "HoloLens" of Microsoft.

In a preferred embodiment of the first variant of the method of the invention, it is provided that the method steps of selecting, or inputting, the parameter value and/or of confirming the selected, or input, parameter value occur by means of a gesture control. The operator points, for example, with its hand at a symbol, or touches the symbol. The camera registers, in such case, the position of the hand. By defined movements/gesturing with the hand, a parameter value can be lessened/increased, a parameter value confirmed and/or a symbol shifted.

In a second variant of the method of the invention, a mobile end device is used as service unit. Suited for this is, for example, a smart phone or a tablet, or even a laptop, which has a webcam, which enables registering the surroundings in the opposite direction from the operator. The selection of a symbol, the increasing/lessening of a parameter value, the confirming of a parameter value and/or the shifting of a symbol occurs by means of the input means of the mobile end device, for example, by means of contacting the touchscreen, by means of keyboard input and/or by means of inputs via mouse.

In an advantageous embodiment of the method of the invention, it is provided that the confirmed parameter value is transferred by means of a radio connection, especially Bluetooth, to the field device. Alternatively to Bluetooth, any radio connection can be used, for example, W-Fi or Zigbee. Alternatively, the parameter values can be indirectly transferred into the field device. For this, the parameter values are not sent on direct paths to the field device, but, instead, from the service unit to something other than the field device, for example, to the control station of the plant, to another field device, to another service unit, etc., from where the parameter values are then transferred into the field device.

BRIEF DESCRIPTION OF THE DRAWING

The invention will now be explained in greater detail based on the appended drawing, the sole FIGURE of which shows as follows:

FIG. 1 show an example of an embodiment of the method of the present disclosure.

DETAILED DESCRIPTION

FIG. 1 shows a measuring location ML of a plant of process automation. The measuring location ML is composed of a container KO, in which a fill substance FL is kept. The fill substance FL is a fluid-like medium or a bulk good. For monitoring the fill level h of the fill substance FL in the container KO, a field device FD in the form of a contactless fill level measuring device is mounted on the container KO. The fill level h of the fill substance FL is measured by the field device, which transmits a measuring signal MS. The measuring signal MS is reflected on the surface of the fill substance FL. The reflected signal RS is received by the field device FD and processed. Based on characteristic variables of the reflected signal RS, for example, based on the duration between the sending of the measuring signal MS and the receiving of the reflected signal RS, the fill level h of the fill substance FL can be determined.

For start-up, the field device FD must be parametered. Conventionally, the parametering, thus the assignment of parameter values for specific parameters, of the field device FD is done text based by means of a service unit SU. For this, however, a thorough technical understanding can be required on the part of the operator OP.

The method of the invention, which will be explained in greater detail below, facilitates the start-up of the field device FD, especially for less experienced users/operators OP.

After mounting the field device FD on the container KO, the operator OP connects with its service unit SU, here in the form of a smart glasses, with the field device FD. The connection occurs wirelessly, for example, via Bluetooth (LE) or W-Fi. Then, the service unit SU reads the identification data of the field device FD and reconciles such with a database. The database is especially accessible via the Internet. To this end, the service unit SU has a mobile radio module, via which the service unit can contact the database. After completed reconciliation, the database transfers to the service unit the parameters to be set for the field device FD. The service unit SU then leads the operator OP step by step through the parametering of the field device FD:

In a first step, the limit values of the field device FD are set. For this, the parameters "maximum value of the fill level h", "minimum value of the fill level h" and/or "overflow protection value of the fill level h" must be assigned measuring location specific, parameter values.

After ascertaining these parameters to be set, the service unit SU shows these as symbols $S_{max}$, $S_{min}$, $S_{OF}$ on the display unit DU of the service unit SU. For this, the service unit SU registers the measuring location ML by means of a camera KA. The live image of the camera KA is displayed as an image on the display unit DU. The service unit is able by means of the camera to measure the container KO of the measuring location and to show the dimensions of the container KO. It can, in such case, be provided to show a ruler for the fill level h on the image, especially alongside the container KO, and in parallel with the longitudinal axis of the container KO.

For displaying the symbols $S_{max}$, $S_{min}$, $S_{OF}$, these are placed virtually on the image registered by the camera KA, besides the ruler for the fill level h of the container KO. For setting the parameter values of these parameters, the operator OP can use two different methods:

In the first case, the operator OP selects per gesture control one of the three symbols $S_{max}$, $S_{min}$, $S_{OF}$. Upon this, an input screen opens. The operator OP then inputs a value of the fill level for the selected parameter. The particular symbol $S_{max}$, $S_{min}$, $S_{OF}$ is then shifted to the height on the ruler appropriate for the value that was input.

In the second case, the operator OP shifts the symbols $S_{max}$, $S_{min}$, $S_{OF}$ to the desired fill level h on the ruler. Upon this, the corresponding numerical value is then ascertained.

After input of all parameter values for the said parameters, the operator OP confirms the input. Thereupon, the parameter values are transferred into the field device FD. This stores the parameter values in the corresponding registers of the parameters.

In the next step of the parametering, the measurement curve MK of the field device FD is analyzed. For this, the field device FD creates a measurement curve MK in a first step. The measurement curve shows the height of the reflected signal $SIG_R$ versus the fill level h in the container KO. If an object reflects a part of the measuring signal $SIG_M$, then this is shown in the measurement curve MK as a maximum M1, M2, M3. In order to determine the correct fill level h of the fill substance FL, the field device FD must be told, which of the maxima M1, M2, M3 is the reflection of the measuring signal $SIG_M$ on the surface of the fill substance FL.

In this regard, the service unit SU receives the currently measured measurement curve MK transferred from the field device FD and checks such for maxima M1, M2, M3. These maxima M1, M2, M3 are shown as symbols $S_{M1}$, $S_{M2}$, $S_{M3}$, which are superimposed in such a manner on the image of the display unit DU that the symbols $S_{M1}$, $S_{M2}$, $S_{M3}$ are arranged at the corresponding fill levels along the container KO, where the maxima M1, M2, M3 occur.

Especially, it is provided that the measurement curve MK is continually updated, so that the symbols $S_{M1}$, $S_{M2}$, $S_{M3}$ are continually shown at the current positions of the maxima M1, M2, M3. Using gesture control, the operator OP selects the correct maximum M2, which shows the reflection of the measuring signal $SIG_M$ on the surface of the fill substance FL. For this, the operator OP must approximately know the fill level h of the fill substance FL currently present in the container KO.

In the present case, the maximum M1 represents a reflection of the measuring signal $SIG_M$ on a tube component in the container KO. Maximum M3 represents a reflection of the measuring signal $SIG_M$ on the floor of the container KO. Maximum M2 represents the correct parameter value, which the field device FD requires for evaluation of the measurement curve and therewith for correctly ascertaining the current fill level of the fill substance.

After confirmation of the selected maximum M1, M2, M3, such parameter value is transferred into the field device FD. This stores the parameter values in the corresponding registers of the parameters.

Then, in similar manner, other, different parameters of the field device FD can be parametered by means of the service unit SU.

Alternatively to a smart glasses, a mobile end device can also be used as service unit SU. Suited for this, is, for example, a smart phone or a tablet, or even a laptop with a webcam. The selection of a symbol $S_{max}$, $S_{min}$, $S_{OF}$, $S_{M1}$, $S_{M2}$, $S_{M3}$, the increasing/lessening of a parameter value, the confirming of a parameter value and/or the shifting of a symbol $S_{max}$, $S_{min}$, $S_{OF}$, $S_{M1}$, $S_{M2}$, $S_{M3}$ occurs by means of the input means of the mobile end device, for example, by means of contacting the touchscreen, by means of keyboard input and/or by means of input via mouse.

The method of the invention is suited for all field device types and is not limited, for instance, to fill level measuring devices. The example shown in FIG. 1 relates, however, to fill level measuring devices and presents parameters to be set, which are typical for fill level measuring devices. In the case of application of other field device types, these parameters are, in given cases, not present and other parameter types are set.

The invention claimed is:

1. A method for starting-up using a service unit a field device of automation technology mounted on a container at a measuring location, wherein the service unit includes a display unit and a camera, the method comprising:
   identifying the field device using the service unit;
   registering a reference geometry by means of the camera, wherein the reference geometry has a defined length in at least one dimension;
   creating, based on the reference geometry, a three-dimensional, polygonal network, wherein the three-dimensional, polygonal network is used to measure objects registered by the camera and to define a ruler for the objects registered by the camera and shown in an image;
   ascertaining at least one parameter to be set based on the identifying of the field device;
   showing by means of the display unit the at least one parameter to be set, wherein the display unit shows a field of view of an operator, and wherein the at least one parameter to be set is shown as at least one virtual symbol that is superimposed at least partially on the field of view shown on the display unit;
   selecting at least one predetermined parameter value, or inputting at least one parameter value;
   confirming the selected, or input, parameter value; and
   transferring the confirmed parameter value into the field device and storing the parameter value in the field device.

2. The method as claimed in claim 1, wherein the display unit shows as the field of view of the operator a continuously updated image registered by the camera, and wherein the virtual symbol is superimposed at least partially on the image displayed by the display unit.

3. The method as claimed in claim 1, wherein the field device is a fill level measuring device that works according to a contactless measuring method, including an ultrasonic measuring principle, a pulse travel time measuring principle, or a FMCW, measuring principle, to determine a fill level of a fill substance in the container.

4. The method as claimed in claim 3, wherein the at least one parameter to be set includes a maximum value of a fill level of the fill substance in the container, a minimum value of a fill level of the fill substance in the container, and/or an overflow protection value of a fill level of the fill substance in the container.

5. The method as claimed in claim 3, when the container is located in the field of view of the operator, the method further comprising:
   measuring the container based on the three dimensional, polygonal network;
   determining a scaling of the container in the field of view; and
   arranging the symbol of the at least one parameter in the field of view alongside the container.

6. The method as claimed in claim 5, wherein the parameter value for the parameter is numerically input, wherein the symbol of the parameter is arranged in such a manner in the field of view alongside the container that it is located at a fill level alongside the container corresponding, in each case, to the numerical value of the parameter.

7. The method as claimed in claim 5, wherein the symbol is manually arranged in the field of view alongside the container, wherein a fill level is ascertained for the symbol corresponding to the scaling of the container, and wherein a converting of the fill level into a numerical value of the parameter occurs.

8. The method as claimed in claim 1, further comprising:
  recording a measurement curve of the fill level measuring device, wherein the measurement curve shows an amplitude of a reflected measuring signal as a function of a measured distance, wherein the measurement curve has at least two maxima that are located at a first and a second fill levels.

9. The method as claimed in claim 8, wherein the first and the second fill levels are displayed as symbols in the field of view, wherein the symbols are arranged at the corresponding, first and second fill levels to scale at the container shown in the field of view.

10. The method as claimed in claim 9, wherein as parameter a fill substance maximum of the measurement curve is set, wherein as fill substance maximum that one of the two fill levels is selected that corresponds to the actual current height of the fill sub stance.

11. The method as claimed in claim 1, wherein used as service unit are smart glasses.

12. The method as claimed in claim 11, wherein the method steps of selecting, or inputting, the parameter value and/or of confirming the selected, or input, parameter value occur using a gesture control.

13. The method as claimed in claim 1, wherein a mobile end device is used as service unit.

14. The method as claimed in claim 1, wherein the confirmed parameter value is transferred to the field device by means of a radio connection.

\* \* \* \* \*